US012637086B2

(12) United States Patent
Park et al.

(10) Patent No.: US 12,637,086 B2
(45) Date of Patent: May 26, 2026

(54) APPARATUS FOR ESTIMATING MOTION OF VEHICLE OCCUPANT AND METHOD THEREFOR

(71) Applicants: Hyundai Motor Company, Seoul (KR); Kia Corporation, Seoul (KR); IUCF-HYU (Industry-University Cooperation Foundation Hanyang University), Seoul (KR)

(72) Inventors: Tae Woong Park, Hwaseong-si (KR); Chang Seop An, Incheon (KR); Chung Choo Chung, Seoul (KR); Jin Sung Kim, Seoul (KR); Ying Shuai Quan, Seoul (KR)

(73) Assignees: HYUNDAI MOTOR COMPANY, Seoul (KR); KIA CORPORATION, Seoul (KR); IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 42 days.

(21) Appl. No.: 18/671,504

(22) Filed: May 22, 2024

(65) Prior Publication Data
US 2025/0128715 A1 Apr. 24, 2025

(30) Foreign Application Priority Data
Oct. 18, 2023 (KR) ........................ 10-2023-0139657

(51) Int. Cl.
B60W 40/08 (2012.01)
B60W 50/00 (2006.01)

(52) U.S. Cl.
CPC ........ B60W 40/08 (2013.01); B60W 50/0097 (2013.01); B60W 2050/0029 (2013.01);
(Continued)

(58) Field of Classification Search
CPC ............. B60W 40/08; B60W 50/0097; B60W 2050/0029; B60W 2050/0059; B60W 2520/105; B60W 2520/16; B60W 2520/18
(Continued)

(56) References Cited

U.S. PATENT DOCUMENTS 11,738,773 B2 8/2023 Yeom et al.
2019/0022347 A1* 1/2019 Wan ......................... A61B 5/18
(Continued)

FOREIGN PATENT DOCUMENTS

KR 20220003744 A 1/2022
KR 20220012490 A 2/2022
(Continued)

OTHER PUBLICATIONS

Ali Akbari et al., "A Bond Graph Representation of the Sagittal Spine for Estimation of Ride Comfort", 2021 International Conference on Bond Graph Modeling and Simulation, ICBGM, vol. 53, No. 3, 85-94, Nov. 11, 2021, Total pp. 11.
Benedikt Buchheit et al., "Motion Sickness Prediction in Self-Driving Cars Using the 6DOF-SVC Model", IEEE Transactions On Intelligent Transportation Systems, vol. 23, No. 8, 13582-13591, Aug. 2022, Total pp. 10.
(Continued)

*Primary Examiner* — Naomi J Small
(74) *Attorney, Agent, or Firm* — Slater Matsil, LLP

(57) ABSTRACT
An apparatus for estimating a motion of a vehicle occupant, and a method therefor, can store motion estimating models of a vehicle occupant, collect behavior data of a vehicle, determine a traveling mode of the vehicle based on a longitudinal acceleration among the behavior data of the vehicle, and estimate a motion of the vehicle occupant using at least one of the motion estimating models corresponding to the traveling mode of the vehicle. The motion estimating models can include a first model corresponding to a dynamic mode of the vehicle and a second model corresponding to a steady state mode of the vehicle.

20 Claims, 10 Drawing Sheets

(52) U.S. Cl.
CPC .............. *B60W 2050/0059* (2013.01); *B60W 2520/105* (2013.01); *B60W 2520/16* (2013.01); *B60W 2520/18* (2013.01)

(58) Field of Classification Search
USPC ..................................................... 340/573.1
See application file for complete search history.

(56) References Cited

U.S. PATENT DOCUMENTS

| | | | | |
|---|---|---|---|---|
| 2020/0062240 A1* | 2/2020 | Marzorati | ............... | G06F 3/011 |
| 2021/0114553 A1* | 4/2021 | Awtar | ....................... | B60N 2/04 |
| 2022/0001894 A1 | 1/2022 | Yeom et al. | | |
| 2023/0143296 A1* | 5/2023 | Giovanardi | .......... | B60W 10/20 |
| | | | | 701/37 |
| 2024/0326591 A1* | 10/2024 | Monaco | ................... | B60Q 3/80 |

FOREIGN PATENT DOCUMENTS

| | | |
|---|---|---|
| KR | 20220051061 A | 4/2022 |
| KR | 20210158525 A | 12/2024 |

OTHER PUBLICATIONS

Cho-Chung Liang et al., "A study on biodynamic models of seated human subjects exposed to vertical vibration", International Journal of Industrial Ergonomics, vol. 36, 869-890, Sep. 1, 2006, Total pp. 22.

Eunil Kim et al., "Modeling Motion Sickness Using a Four-Wheel Vehicle Model Augmented with a Passenger Model", 2021 International Conference on Bond Graph Modeling and Simulation, ICBGM, vol. 53, No. 3, 57-66, Nov. 10, 2021, Total pp. 11.

Sarah .Atifah Saruchi et al., "Lateral control strategy based on head movement responses for motion sickness mitigation in autonomous vehicle", Journal of the Brazilian Society of Mechanical Sciences and Engineering, vol. 42, Apr. 8, 2020, Total pp. 14.

Younggun Cho et al., "Biomechanical model of human on seat with backrest for evaluating ride quality", International Journal of Industrial Ergonomics, vol. 27, 331-345, 2001, Total pp. 15.

Yunus Ziya Arslan et al., "Improving the ride comfort of vehicle passenger using fuzzy sliding mode controller", Journal of Vibration and Control, vol. 21, Issue 9, 1667-1679, Aug. 14, 2013, Total pp. 13.

* cited by examiner

| Acceleration | Speed | Roll | pitch | Mean square error | Max error |
|:---:|:---:|:---:|:---:|:---:|:---:|
| √ | √ | | | 1.3486 | 3.8143 |
| √ | √ | √ | | 1.3250 | 3.8395 |
| √ | √ | | √ | 1.3321 | 3.6560 |
| √ | √ | √ | √ | 0.5209 | 2.8498 |

FIG.3

APPARATUS FOR ESTIMATING MOTION OF VEHICLE OCCUPANT AND METHOD THEREFOR

CROSS-REFERENCE TO RELATED APPLICATIONS

This application claims the benefit of Korean Patent Application No. 10-2023-0139657, filed on Oct. 18, 2023, which application is hereby incorporated herein by reference.

TECHNICAL FIELD

The present disclosure relates to estimating a motion of a vehicle occupant.

BACKGROUND

In general, motion sickness may occur when a person is exposed to one or more specific motions for a long period of time. In this case, factors such as temperature, smell, mood, and digestion may serve to promote the motion sickness.

The motion sickness, which is accompanied by dizziness and vomiting when a user rides on a vehicle, occurs when input mismatch occurs between sensory organs that maintain a balance or detect a movement and posture (e.g., vision, proprioceptors, semicircular canals, or the like) and thus a brain becomes temporarily confused.

In humans, the response of the sensory organs such as eyes and ears to muscle movement is remembered in brains. When a similar movement occurs later, the sensory organs predict, prepare and react this situation in advance based on the remembered information. However, in a state in which the user rides in the vehicle, because there is no muscle movement due to the movement or there is a movement different from those of the previous memories, the mismatch in sensation occurs, and thus the motion sickness occurs.

As the related art for predicting the motion sickness of the vehicle occupant, a method of simply using only vibration information of the vehicle cannot accurately predict the motion sickness of the occupant, and a method of attaching a sensor to a body of the occupant may increase prediction accuracy, but has substantially low utilization because discomfort due to the attachment of the sensor is caused to the occupant.

The content described in this Background section is made to promote understanding of the background of the disclosure and may include contents that are not prior art already publicly known, available, or in use.

SUMMARY

The present disclosure relates to a technology for estimating a motion of a vehicle occupant (e.g., a motion of a head) using behavior data of a vehicle.

Some embodiments of the present disclosure can solve the above-mentioned problems occurring in the prior art while advantages achieved by the prior art are maintained intact.

An embodiment of the present disclosure provides an apparatus for estimating a motion of a vehicle occupant and a method therefor, in which behavior data of a vehicle is collected, a traveling mode of the vehicle is determined based on a longitudinal acceleration among the behavior data of the vehicle, a motion of the vehicle occupant is estimated based on a model corresponding to the traveling mode of the vehicle, and thus the motion of the vehicle occupant may be easily and accurately estimated.

An embodiment of the present disclosure provides an apparatus for estimating a motion of a vehicle occupant and a method therefor, in which a motion estimating model (hereinafter, referred to as a first model) of a vehicle occupant based on behavior data of a vehicle traveling in a dynamic mode and a motion estimating model (hereinafter, referred to as a second model) of the vehicle occupant based on behavior data of the vehicle traveling in a steady state mode are provided, the behavior data of the vehicle is collected, a traveling mode of the vehicle is determined based on a longitudinal acceleration among the behavior data of the vehicle, a motion (e.g., a motion of a head of the vehicle occupant) of the vehicle occupant is estimated based on the first model when the vehicle travels in the dynamic mode, the motion of the vehicle occupant is estimated based on the second model when the vehicle travels in the steady state mode, and thus the motion of the head of the vehicle occupant may be easily and accurately estimated.

An embodiment of the present disclosure provides an apparatus for estimating a motion of a vehicle occupant and a method therefor, in which three-axis accelerations, three-axis speeds, a roll angle, a roll angle rate, a pitch angle, and a pitch angle rate are collected as behavior data of a vehicle, three-axis accelerations of a head of a vehicle occupant are collected at the same time, a model is generated to estimate three-axis accelerations of the head of the vehicle occupant in the future based on the current behavior data of the vehicle, the current three-axis accelerations of the head of the vehicle occupant, and weights, the three-axis accelerations of the head of the vehicle occupant are estimated based on the model, and thus the motion of the head of the vehicle occupant may be easily and accurately estimated.

An embodiment of the present disclosure provides an apparatus for estimating a motion of a vehicle occupant and a method therefor, in which behavior data of a vehicle is collected, a traveling mode of the vehicle is determined based on a longitudinal acceleration among the behavior data of the vehicle, a model corresponding to the traveling mode of the vehicle is selected, a motion of a vehicle occupant is estimated based on the model, motion sickness of the vehicle occupant is predicted based on the motion of the vehicle occupant, and thus the motion sickness of the vehicle occupant may be predicted with high accuracy.

Advantages of some embodiments of the present disclosure are not necessarily limited to the advantages described above, and other advantages of some embodiments of the present disclosure that are not described may be understood by the following description and may be more clearly understood by example embodiments of the present disclosure. Further, it can be readily apparent that the advantages of some embodiments of the present disclosure may be implemented by units and combinations thereof described in the appended claims.

Technical problems solved by some embodiments of the present disclosure are not necessarily limited to the aforementioned problems, and solutions using an embodiment of the present disclosure for other technical problems not mentioned herein can be clearly understood from the following description by those skilled in the art to which the present disclosure pertains.

According to an embodiment of the present disclosure, an apparatus for estimating a motion of a vehicle occupant includes a storage device that stores a motion estimating model of the vehicle occupant, and a controller that collects behavior data of a vehicle, determines a traveling mode of the vehicle based on a longitudinal acceleration among the behavior data of the vehicle, and estimates the motion of the vehicle occupant using a model corresponding to the traveling mode of the vehicle.

In an embodiment of the present disclosure, the motion estimating model of the vehicle occupant may be a model that estimates the motion of the vehicle occupant corresponding to the behavior data of the vehicle.

In an embodiment of the present disclosure, the storage device may store a first model corresponding to a dynamic mode of the vehicle and a second model corresponding to a steady state mode of the vehicle.

In an embodiment of the present disclosure, the controller may estimate an acceleration of a head of the vehicle occupant, which corresponds to the behavior data of the vehicle based on the first model when the longitudinal acceleration deviates from a first threshold range.

In an embodiment of the present disclosure, the controller may estimate an acceleration of the head of the vehicle occupant, which corresponds to the behavior data of the vehicle based on the second model when the longitudinal acceleration does not deviate from the first threshold range and does not deviate from a second threshold range.

In an embodiment of the present disclosure, the controller may determine, as the acceleration of the head of the vehicle occupant, a value between the acceleration of the head of the vehicle occupant, which is estimated based on the first model and the acceleration of the head of the vehicle occupant, which is estimated based the second model, when the longitudinal acceleration does not deviate from the first threshold range and deviates from the second threshold range.

In an embodiment of the present disclosure, the controller may collect, as the behavior data of the vehicle, at least one of three-axis accelerations, three-axis speeds, a roll angle, a roll angle rate, a pitch angle, a pitch angle rate, or any combinations thereof.

In an embodiment of the present disclosure, the controller may remove noise from the behavior data of the vehicle.

In an embodiment of the present disclosure, the controller may normalize the behavior data of the vehicle from which the noise is removed.

In an embodiment of the present disclosure, the controller may predict motion sickness of the vehicle occupant based on the motion of the vehicle occupant.

According to an embodiment of the present disclosure, a method of estimating a motion of a vehicle occupant includes storing, by a storage device, a motion estimating model of the vehicle occupant, collecting, by a controller, behavior data of a vehicle, determining, by the controller, a traveling mode of the vehicle based on a longitudinal acceleration among the behavior data of the vehicle, and estimating, by the controller, the motion of the vehicle occupant using a model corresponding to the traveling mode of the vehicle.

In an embodiment of the present disclosure, the storing of the motion estimating model of the vehicle occupant may include storing a first model corresponding to a dynamic mode of the vehicle and storing a second model corresponding to a steady state mode of the vehicle.

In an embodiment of the present disclosure, the estimating of the motion of the vehicle occupant may include estimating, by the controller, an acceleration of a head of the vehicle occupant, which corresponds to the behavior data of the vehicle based on the first model when the longitudinal acceleration deviates from a first threshold range, and estimating, by the controller, an acceleration of the head of the vehicle occupant, which corresponds to the behavior data of the vehicle based on the second model when the longitudinal acceleration does not deviate from the first threshold range and does not deviate from a second threshold range.

In an embodiment of the present disclosure, the estimating of the motion of the vehicle occupant may further include determining, by the controller, as the acceleration of the head of the vehicle occupant, a value between the acceleration of the head of the vehicle occupant, which is estimated based on the first model, and the acceleration of the head of the vehicle occupant, which is estimated based the second model, when the longitudinal acceleration does not deviate from the first threshold range and deviates from the second threshold range.

In an embodiment of the present disclosure, the collecting of the behavior data of the vehicle may include collecting, by the controller, as the behavior data of the vehicle, at least one of three-axis accelerations, three-axis speeds, a roll angle, a roll angle rate, a pitch angle, a pitch angle rate, or any combination thereof.

In an embodiment of the present disclosure, the collecting of the behavior data of the vehicle may further include removing, by the controller, noise from the behavior data of the vehicle.

In an embodiment of the present disclosure, the collecting of the behavior data of the vehicle may further include normalizing, by the controller, the behavior data of the vehicle from which the noise is removed.

In an embodiment of the present disclosure, the method may further include predicting, by the controller, motion sickness of the vehicle occupant based on the motion of the vehicle occupant.

BRIEF DESCRIPTION OF THE DRAWINGS

The above and other features and advantages of the present disclosure can be more apparent from the following detailed description taken in conjunction with the accompanying drawings, in which:

FIG. 3 is a table illustrating a process of determining behavior data of the vehicle to generate a model by the controller provided in the apparatus for estimating a motion of a vehicle occupant according to an embodiment of the present disclosure;

DETAILED DESCRIPTION OF ILLUSTRATIVE EMBODIMENTS

Figure 1:
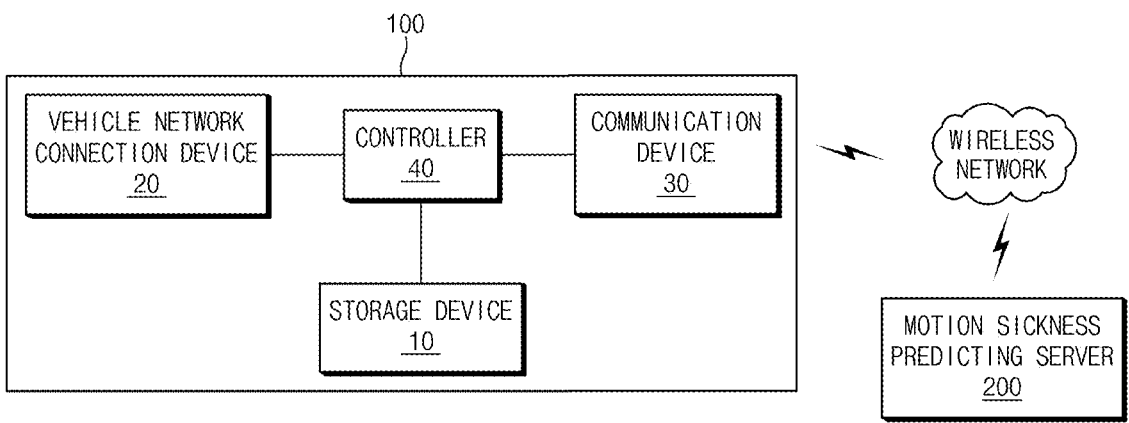
FIG. 1 is a diagram illustrating an apparatus for estimating a motion of a vehicle occupant according to an embodiment of the present disclosure.

Hereinafter, some embodiments of the present disclosure will be described in detail with reference to the example drawings. In adding reference numerals to components of each drawing, it can be noted that identical or equivalent components can be designated by an identical numeral even when they are displayed on other drawings. Further, in describing the embodiment of the present disclosure, a detailed description of a related known configuration or function can be omitted when it is determined that the detailed description interferes with the understanding of the embodiment of the present disclosure.

In the description of the components of the embodiments of the present disclosure, the terms such as "first", "second", "A", "B", "(a)", "(b)", and the like, may be used. Such terms are merely intended to distinguish one component from other components, and such terms do not necessarily limit the nature, order, or sequence of the components. Unless otherwise defined, terms including technical and scientific terms used herein can have a same meaning as commonly understood by one of ordinary skill in the art to which this disclosure pertains. It can be further understood that terms, such as those defined in commonly used dictionaries, can be interpreted as having a meaning that is consistent with their meaning in the context of the relevant art.

FIG. 1 is a diagram illustrating an apparatus for estimating a motion of a vehicle occupant according to an embodiment of the present disclosure.

Referring to FIG. 1, an apparatus 100 for estimating a motion of a vehicle occupant according to an embodiment of the present disclosure may include a storage device 10, a vehicle network connection device 20, a communication device 30, and a controller 40, any combination of or all of which may be in plural or may include plural components thereof. According to a method of implementing the apparatus 100 for estimating a motion of a vehicle occupant according to an embodiment of the present disclosure, respective components may be combined with each other to be implemented as one component or some components may be omitted.

In description of the respective components, the storage device 10 may be a storage medium that stores various instructions, logics, algorithms, and programs used for a process of collecting behavior data of a vehicle through a vehicle network, determining a traveling mode of the vehicle based on a longitudinal acceleration among the behavior data of the vehicle, and estimating a motion of a vehicle occupant based on a model corresponding to the traveling mode of the vehicle.

The storage device 10 may store a first model that estimates the motion of the vehicle occupant (e.g., a motion of a head of the vehicle occupant) based on the behavior data of the vehicle traveling in the dynamic mode and a second model that estimates the motion of the vehicle occupant based on the behavior data of the vehicle traveling in a steady state mode.

The storage device 10 may store various instructions, logics, algorithms, and programs used for a process of collecting the behavior data of the vehicle through the vehicle network, determining the traveling mode of the vehicle based on the longitudinal acceleration among the behavior data of the vehicle, estimating the motion of the head of the vehicle occupant based on the first model when the traveling mode of the vehicle is the dynamic mode, and estimating the motion of the head of the vehicle occupant based on the second model when the traveling mode of the vehicle is the steady state mode.

The storage device 10 may store various instructions, logics, algorithms, and programs used for a process of collecting three-axis accelerations, three-axis speeds, a roll angle, a roll angle rate, a pitch angle, and a pitch angle rate as the behavior data of the vehicle through the vehicle network, collecting three-axis accelerations of the head of the vehicle occupant through a sensor attached to a body of the vehicle occupant, generating a model that estimates the three-axis accelerations of the head of the vehicle occupant in the future based on the current behavior data of the vehicle, the current three-axis accelerations of the head of the vehicle occupant, and weights, and estimating the three-axis accelerations of the head of the vehicle occupant based on the model.

The storage device 10 may store various instructions, logics, algorithms, and programs used for a process of collecting the behavior data of the vehicle through the vehicle network, determining the traveling mode of the vehicle based on the longitudinal acceleration among the behavior data of the vehicle, estimating the motion of the vehicle occupant based on the model corresponding to the traveling mode of the vehicle, and predicting motion sickness of the vehicle occupant based on the motion of the vehicle occupant.

The vehicle network connection device 20, which can be a module that provides an interface of accessing the vehicle network, periodically transmits, to the vehicle network, the three-axis (longitudinal, transverse, and vertical) accelerations, the three-axis speeds, the roll angle, the roll angle rate, the pitch angle, and the pitch angle rate, which can be measured by various sensors in the vehicle. The vehicle network may include a controller area network (CAN), a controller area network with flexible data-rate (CANFD), a local interconnect network (LIN), a FlexRay, a media oriented systems transport (MOST), an Ethernet, or the like, for example.

The communication device 30, which can be a module that provides a communication interface with a motion sickness predicting server 200, may transmit motion data of the vehicle occupant, which can be estimated by the controller 40, to the motion sickness predicting server 200 or transmit a message, by the controller 40, that notifies of the possibility of the motion sickness of the vehicle occupant to the motion sickness predicting server 200. The communication device 30 may include at least one of a mobile communication module, a wireless Internet module, and a short-range communication module.

The mobile communication module may communicate with the motion sickness predicting server 200 through a mobile communication network that is established according to technical standards or communication methods for mobile communication (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTEA) or the like), for example.

The wireless Internet module, which can be a module for wireless Internet access, may communicate with the motion sickness predicting server 200 through wireless local area network (WLAN), wireless-fidelity (Wi-Fi), Wi-Fi Direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A) or the like, for example.

The short-range communication module may support short-range communication with the motion sickness predicting server 200 by using at least one of Bluetooth™, radio frequency identification (RFID), infrared prediction (IrDA), ultra wideband (UWB), ZigBee, near field communication (NFC), and wireless universal serial bus (Wireless USB), for example.

The controller 40 may perform overall control so that the respective components may normally perform functions thereof. The controller 40 may be implemented in the form of hardware, may be implemented in the form of software, or may be implemented in the form in which the hardware and the software are combined. The controller 40 can include one or more processors. The controller 40 may be implemented as a microprocessor, but the present disclosure is not necessarily limited thereto.

The controller 40 may collect the behavior data of the vehicle through the vehicle network, may determine the traveling mode of the vehicle based on the longitudinal acceleration among the behavior data of the vehicle, and may estimate the motion of the vehicle occupant based on the model corresponding to the traveling mode of the vehicle.

The controller 40 may estimate the motion of the head of the vehicle occupant (e.g., three-axis accelerations) based on the first model stored in the storage device 10 when the traveling mode of the vehicle is the dynamic mode and may estimate the motion of the head of the vehicle occupant based on the second model when the traveling mode of the vehicle is in the steady state mode.

Further, the controller 40 may collect the three-axis (longitudinal, transverse, and vertical) accelerations, the three-axis speeds, the roll angle, the roll angle rate, the pitch angle, and the pitch angle rate as the behavior data of the vehicle through the vehicle network.

In addition, the controller 40 may collect three-axis accelerations of the head of the vehicle occupant through the sensor attached to the body of the occupant.

Further, the controller 40 may generate a model that estimates the three-axis accelerations of the head of the vehicle occupant in the future based on the current behavior data of the vehicle, the current three-axis accelerations of the head of the vehicle occupant, and the weights.

Hereinafter, an example process of generating a model that estimates the three-axis accelerations of the head of the vehicle occupant by the controller 40 will be described with reference to FIGS. 2 to 5.

Figure 2:
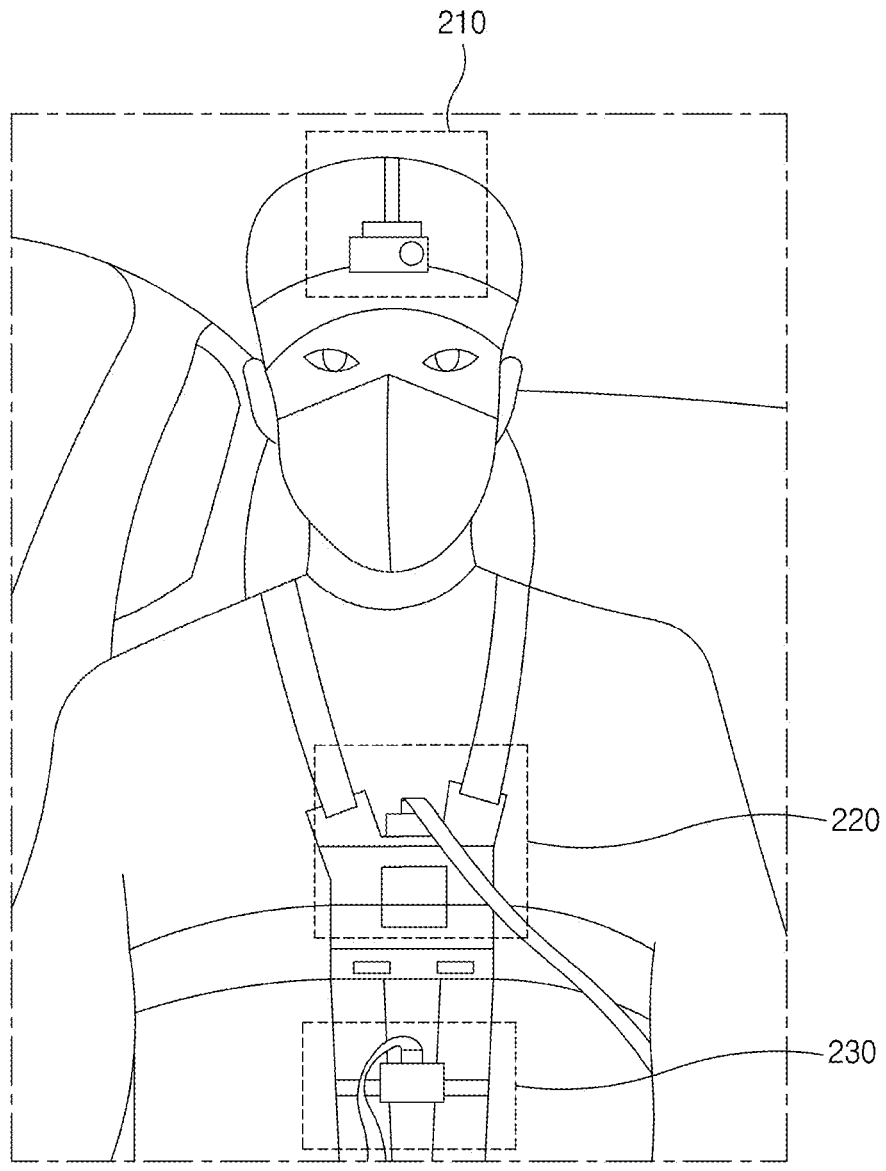
FIG. 2 is an front view of a vehicle occupant illustrating an attachment position of a human body sensor used in a process of generating a model by a controller provided in the apparatus for estimating a motion of the vehicle occupant according to an embodiment of the present disclosure.

FIG. 2 is a front view of a vehicle occupant illustrating an attachment position of a human body sensor used in a process of generating a model by a controller provided in the apparatus for estimating a motion of the vehicle occupant according to an embodiment of the present disclosure.

Referring to FIG. 2, a three-axis acceleration sensor 210 for measuring the three-axis accelerations of the head of the vehicle occupant may be attached to the head, a three-axis acceleration sensor 220 for measuring three-axis accelerations of a chest of the vehicle occupant can be attached to the chest of the vehicle occupant, and a three-axis acceleration sensor 230 for measuring three-axis accelerations of an abdomen of the vehicle occupant may be attached to the abdomen of the vehicle occupant. The three-axis acceleration sensors 210, 220, and 230 may be activated by the controller 40 and may measure the three-axis accelerations of the head, the three-axis accelerations of the chest, and the three-axis accelerations of the abdomen of the vehicle occupant in synchronization with the behavior data of the vehicle under the control of the controller 40. A factor that can have the greatest influence on the motion sickness is the head of the vehicle occupant. Thus, as an example, a process of generating a model using the three-axis accelerations of the head will be described below.

FIG. 3 is a table illustrating a process of determining behavior data of the vehicle to generate a model by the controller provided in the apparatus for estimating a motion of a vehicle occupant according to an embodiment of the present disclosure.

Referring to FIG. 3, the controller 40 may collect an acceleration, a speed, a roll, and a pitch as the behavior data of the vehicle that affects the three-axis accelerations of the head and determine which combination of the behavior data of the vehicle provides optimal performance. The controller 40 may use a mean square error (MSE) and a max error (ME) for a method of verifying fitting performance.

It may be identified that, when the acceleration and the speed are used, the MSE is 1.3486 and the ME is 3.8143. It may be identified that, when the acceleration, the speed, and the roll are used, the MSE is 1.3250 and the ME is 3.8395. It may be identified that, when the acceleration, the speed, and the pitch are used, the MSE is 1.3321 and the ME is 3.6560. It may be identified that, when all the acceleration, the speed, the roll, and the pitch are used, the MSE is 0.5209 and the ME is 2.8498.

As a result, when all the acceleration, the speed, the roll, and the pitch are used, the MES and the ME can be the lowest, and thus the controller 40 may determine the acceleration, the speed, the roll, and the pitch as the behavior data of the vehicle. The acceleration may include the three-axis (x axis, y axis, and z axis) accelerations, the speed may include the three-axis speeds, the roll may include the roll angle and the roll angle rate, and the pitch may include the pitch angle and the pitch angle rate.

Thereafter, the controller 40 may use filter algorithms such as a Kalman filter, a high pass filter (HPF), and a low pass filter (LPF) to remove noise included in the three-axis accelerations, the three-axis speeds, the roll angle, the roll angle rate, the pitch angle, and the pitch angle rate.

Thereafter, because scales of the three-axis accelerations, the three-axis speeds, the roll angle, the roll angle rate, the pitch angle, and the pitch angle rate can be different from each other, the controller 40 may perform a normalization process to adjust the scales to be the same. For example, when first data is in a range of −2 to 2 and second data is in a range of −100 to 100, the controller 40 may normalize these ranges to the same range of −1 to 1.

Thereafter, the controller 40 may use the three-axis accelerations, the three-axis speeds, the roll angle, the roll angle rate, the pitch angle, and the pitch angle rate, which have been completely normalized, to generate a column vector "Z" as in [Equation 1] below.

$$Z = \left[ a_{xyz}^{head} \; a_{xyz}^{car} \; V_{xyz} \; \phi \; \dot{\phi} \; \theta \; \dot{\theta} \right]^{T} \qquad \text{[Equation 1]}$$

In Equation 1, $a_{xyz}^{head}$ represents the three-axis accelerations of the head of the vehicle occupant, $a_{xyz}^{car}$ represents the three-axis accelerations of the vehicle, $V_{xyz}$ represents three-axis speeds, $\phi$ represents the roll angle of the vehicle, $\dot{\phi}$ represents the roll angle rate of the vehicle, $\theta$ represents the pitch angle of the vehicle, and $\dot{\theta}$ represents the pitch angle rate of the vehicle.

Thereafter, the controller 40 may generate a dataset matrix used for modeling using the column vector "Z" of [Equation 1]. The controller 40 may form i dataset matrices from a $k^{th}$ time step to a $(k+i-1)^{th}$ time step as in [Equation 2] below.

$$Z(k) = \begin{bmatrix} Z^{T}(k) \\ Z^{T}(k+1) \\ \vdots \\ Z^{T}(k+i-1) \end{bmatrix} = \qquad \text{[Equation 2]}$$

$$\begin{bmatrix} a_{xyz}^{head}(k) & a_{zyx}^{car}(k) & \dots & \dot{\theta}(k) \\ a_{xyz}^{head}(k+1) & a_{xyz}^{car}(k+1) & \dots & \dot{\theta}(k+1) \\ \vdots & \vdots & \vdots & \vdots \\ a_{xyz}^{head}(k+i-1) & a_{xyz}^{car}(k+i-1) & \dots & \dot{\theta}(k+i-1) \end{bmatrix}$$

Thereafter, the controller 40 may combine [Equation 2] to generate a multi-feature as in [Equation 3] below.

$$\Theta(Z) = \left[ 1 \; Z \; Z^{P_2} \; Z^{P_3} \; \dots \; \right] \qquad \text{[Equation 3]}$$

In Equation 3, components of the multi-feature may be expressed as [Equation 4] below. In this case, up to $P_5$ may be indicated, but the present disclosure is not necessarily limited thereto.

$$Z^{P_2} = \begin{bmatrix} a_{xyz}^{head^2}(k) & a_{xyz}^{head}(k)a_{xyz}^{car}(k) & a_{xyz}^{head}(k)V_{xyz}(k) & \dots \\ a_{xyz}^{head^2}(k+1) & a_{xyz}^{head}(k+1) & a_{xyz}^{head}(k+1) & \dots \\ & a_{xyz}^{car}(k+1) & V_{xyz}(k+1) & \\ \vdots & \vdots & \vdots & \ddots \end{bmatrix} \qquad \text{[Equation 4]}$$

$$Z^{P_3} =$$

$$\begin{bmatrix} a_{xyz}^{head^3}(k) & a_{xyz}^{head^2}(k)a_{xyz}^{car}(k) & a_{xyz}^{head^2}(k)V_{xyz}(k) & \dots \\ a_{xyz}^{head^3}(k+1) & a_{xyz}^{head^2}(k+1)a_{xyz}^{car}(k+1) & a_{xyz}^{head^2}(k+1)V_{xyz}(k+1) & \dots \\ \vdots & \vdots & \vdots & \ddots \end{bmatrix}$$

$$Z^{P_4} =$$

$$\begin{bmatrix} a_{xyz}^{head^4}(k) & a_{xyz}^{head^3}(k)a_{xyz}^{car}(k) & a_{xyz}^{head^3}(k)V_{xyz}(k) & \dots \\ a_{xyz}^{head^4}(k+1) & a_{xyz}^{head^3}(k+1)a_{xyz}^{car}(k+1) & a_{xyz}^{head^3}(k+1)V_{xyz}(k+1) & \dots \\ \vdots & \vdots & \vdots & \ddots \end{bmatrix}$$

$$Z^{P_5} =$$

-continued $$\begin{bmatrix} a_{xyz}^{head^5}(k) & a_{xyz}^{head^4}(k)a_{xyz}^{car}(k) & a_{xyz}^{head^4}(k)V_{xyz}(k) & \dots \\ a_{xyz}^{head^5}(k+1) & a_{xyz}^{head^4}(k+1)a_{xyz}^{car}(k+1) & a_{xyz}^{head^4}(k+1)V_{xyz}(k+1) & \dots \\ \vdots & \vdots & \vdots & \ddots \end{bmatrix}$$

In Equation 4, $a_{xyz}^{head^2}$ represents the square of the acceleration of the head, and $a_{xyz}^{head}V_{xyz}$ is a product of the acceleration of the head and the speed of the vehicle.

The multi-feature expressed as in [Equation 3] and [Equation 4] can include a non-linear element for expressing a motion of an occupant. In general, the motion of the occupant can have a non-linear relationship with the behavior data of the vehicle. Thus, nonlinear modeling can be used for estimating the motion of the occupant using the behavior data of the vehicle. As a result, [Equation 3] and [Equation 4] can correspond to data in which combinations of the behavior data of the vehicle are formed non-linearly. That is, [Equation 3 and [Equation 4] can be non-linear models that express a non-linear relationship between the motion of the occupant and the behavior data of the vehicle.

Thereafter, the controller 40 may determine a weight of the multi-feature using a weight matrix such as [Equation 5] below. In this case, calculating the weight matrix $\Xi$ ultimately can induce a model that estimates the motion of the occupant. [Equation 5] below may be expressed as illustrated in FIG. 4 to obtain the weight matrix.

$$Z(k+1) = \Theta(Z)\Xi = \left[ 1 \; Z \; Z^{P_2} \; Z^{P_3} \; \dots \; \right] \qquad \text{[Equation 5]}$$

Figure 4:
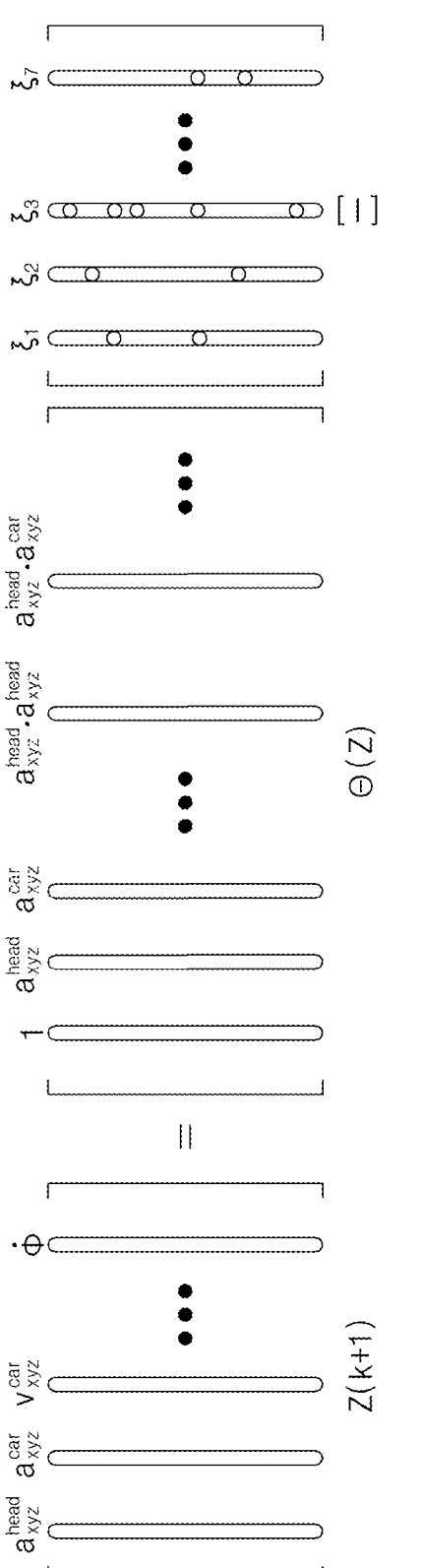
FIG. 4 is a diagram illustrating a state in which the controller provided in the apparatus for estimating a motion of a vehicle occupant according to an embodiment of the present disclosure expresses a relationship between the behavior data of the vehicle and a motion of an occupant using weights.

FIG. 4 is a diagram illustrating a state in which the controller provided in the apparatus for estimating a motion of a vehicle occupant according to an embodiment of the present disclosure can express a relationship between behavior data of the vehicle and a motion of an occupant using weights.

On a left side of FIG. 4, a target can be the acceleration $a_{xyz}^{head}$ of the head of the vehicle occupant, and thus the controller 40 may determine the acceleration of the head of the vehicle occupant using a first column $\xi_1$ of the weight matrix $\Xi$. In this case, an acceleration of the head of the vehicle occupant may be an acceleration of the head in a vertical direction "z."

Thereafter, when the controller 40 extracts only the acceleration $a_{xyz}^{head}$ of the head of the vehicle occupant from the left side of FIG. 4, FIG. 4 may be expressed as [Equation 6] below.

$$\begin{bmatrix} a_{xyz}^{head}(k+1) \\ a_{xyz}^{head}(k+2) \\ a_{xyz}^{head}(k+3) \\ \vdots \end{bmatrix} = \qquad \text{[Equation 6]}$$

$$\begin{bmatrix} 1 & a_{xyz}^{head}(k) & a_{xyz}^{car}(k) & V_{xyz}(k) & \dots \\ 1 & a_{xyz}^{head}(k+1) & a_{xyz}^{car}(k+1) & V_{xyz}(k+1) & \dots \\ 1 & a_{xyz}^{head}(k+2) & a_{xyz}^{car}(k+2) & V_{xyz}(k+2) & \dots \\ \vdots & \vdots & \vdots & \vdots & \ddots \end{bmatrix} \begin{bmatrix} \xi_{11} \\ \xi_{12} \\ \xi_{13} \\ \vdots \end{bmatrix}$$

In Equation 6, "$\xi_{11} \; \xi_{12} \; \xi_{13} \dots$" represent detailed weights included in $\xi_1$ illustrated in FIG. 4.

Thereafter, the controller 40 may solve an optimization problem as in [Equation 7] below to determine $\xi_1$. That is, the controller 40 may determine 1 that minimizes a cost function "J."

$$J = \begin{bmatrix} a_{xyz}^{head}(k+1) \\ a_{xyz}^{head}(k+2) \\ a_{xyz}^{head}(k+3) \\ \vdots \end{bmatrix} -$$

[Equation 7]

$$\begin{bmatrix} 1 & a_{xyz}^{head}(k) & a_{xyz}^{car}(k) & V_{xyz}(k) & \cdots \\ 1 & a_{xyz}^{head}(k+1) & a_{xyz}^{car}(k+1) & V_{xyz}(k+1) & \cdots \\ 1 & a_{xyz}^{head}(k+2) & a_{xyz}^{car}(k+2) & V_{xyz}(k+2) & \cdots \\ \vdots & \vdots & \vdots & \vdots & \ddots \end{bmatrix} \begin{bmatrix} \xi_{11} \\ \xi_{12} \\ \xi_{13} \\ \vdots \end{bmatrix}$$

In Equation 7, to estimate the motion of the vehicle occupant using only the behavior data of the vehicle, a measured human body data and a weight $\xi_{12}$ corresponding thereto are not necessarily used.

As a result, the controller 40 may determine an optimal weight matrix by optimizing a cost function as in [Equation 8] below using an "interior method" or a "trust region method."

$$\Xi^* = \min_{\Xi} J = \min_{\Xi} \|Z(k+1) - \Theta(Z)\Xi\|_2$$

[Equation 8]

subject to $\xi_{ij} = 0$ where $i, j$ are related to $a_z^{head}$

Thereafter, the controller 40 may generate a model that estimates the three-axis accelerations of the head of the vehicle occupant based on the optimized weight matrix $\Xi^*$. In this case, the optimized weight matrix $\Xi^*$ may be a fixed value that is a constant. In addition, the model is as illustrated in FIG. 5.

Figure 5:
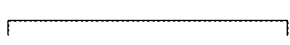
FIG. 5 is a diagram illustrating the model generated by the controller provided in the apparatus for estimating a motion of a vehicle occupant according to an embodiment of the present disclosure.
Figure 5:
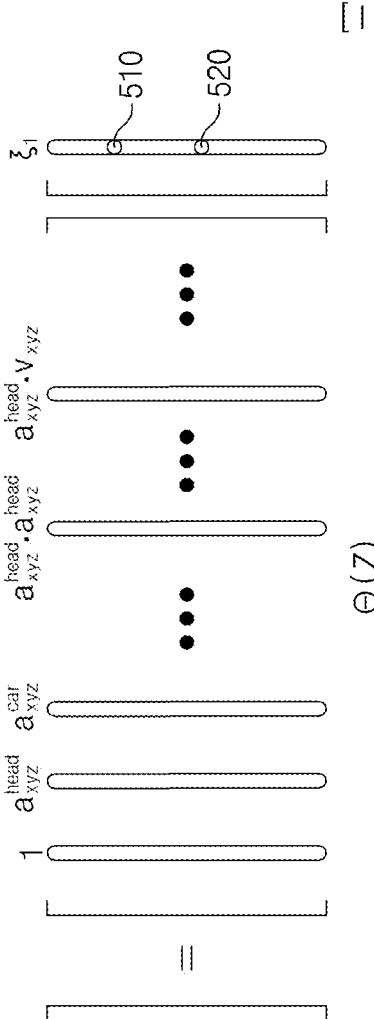
Figure 5:
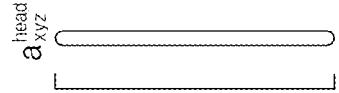

FIG. 5 is a diagram illustrating the model generated by the controller provided in the apparatus for estimating a motion of a vehicle occupant according to an embodiment of the present disclosure.

In FIG. 5, $$a_{xyz}^{head}$$

on the left side represents the three-axis accelerations of the head of the vehicle occupant to be estimated, $$a_{xyz}^{car} \text{ and } a_{xyz}^{car} \cdot V_{xyz}$$

on the right side represent the behavior data of the vehicle or a combination of the behavior data of the vehicle, reference numeral "510" on the right side represents a weight corresponding to $$a_{xyz}^{car},$$

and reference numeral "520" represents a weight corresponding to $$a_{xyz}^{car} \cdot V_{xyz}.$$

In this case, $$a_{xyz}^{head} \text{ and } a_{xyz}^{head} \cdot a_{xyz}^{head}$$

on the right side include the human body data and thus are not used.

The controller 40 may separately generate the first model applied when the traveling mode of the vehicle is the dynamic mode and the second model applied when the traveling mode of the vehicle is the steady state mode. The reason will be described through FIGS. 6 and 7.

Figure 6:
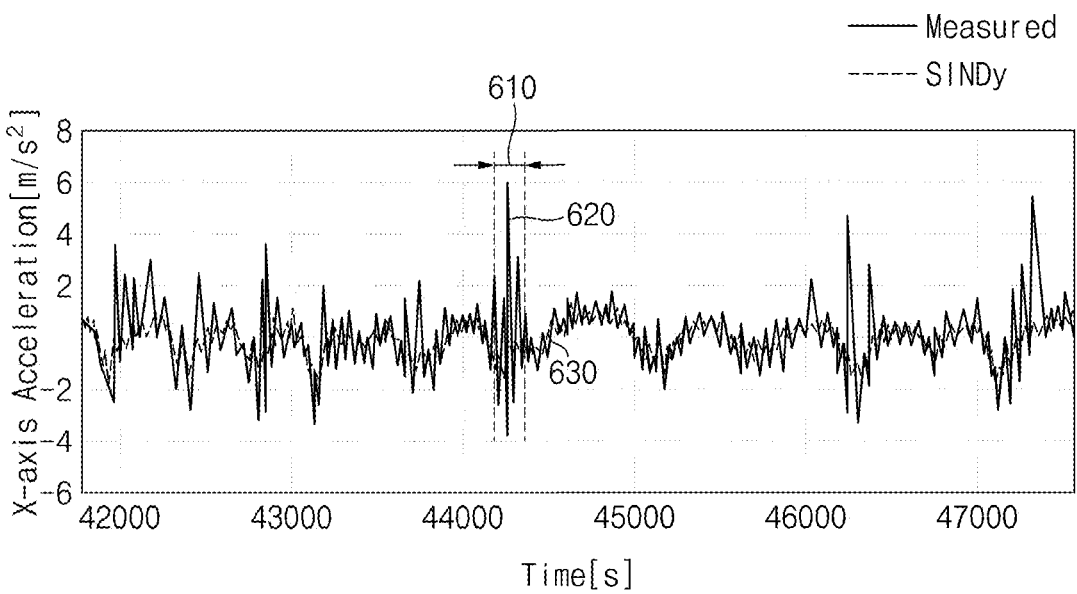
FIG. 6 is a graph illustrating performance of a second model generated using a dataset collected in a steady state mode by the controller provided in the apparatus for estimating a motion of a vehicle occupant according to an embodiment of the present disclosure.

FIG. 6 is a graph illustrating performance of a second model generated using a dataset collected in a steady state mode by the controller provided in the apparatus for estimating a motion of a vehicle occupant according to an embodiment of the present disclosure.

In FIG. 6, a horizontal axis represents a time, and a vertical axis represents an x-axis acceleration. Further, reference numeral "610" represents a dynamic traveling section in which a peak occurs, reference numeral "620" represents an x-axis acceleration of the head of the occupant, which is actually measured, and reference numeral "630" represents an x-axis acceleration of the head of the occupant, which is estimated by the second model.

As illustrated in FIG. 6, it may be identified that the second model based on the dataset collected in the steady state mode of the vehicle may have poor fitting performance in the dynamic traveling section 610 in which a peak occurs.

Figure 7:
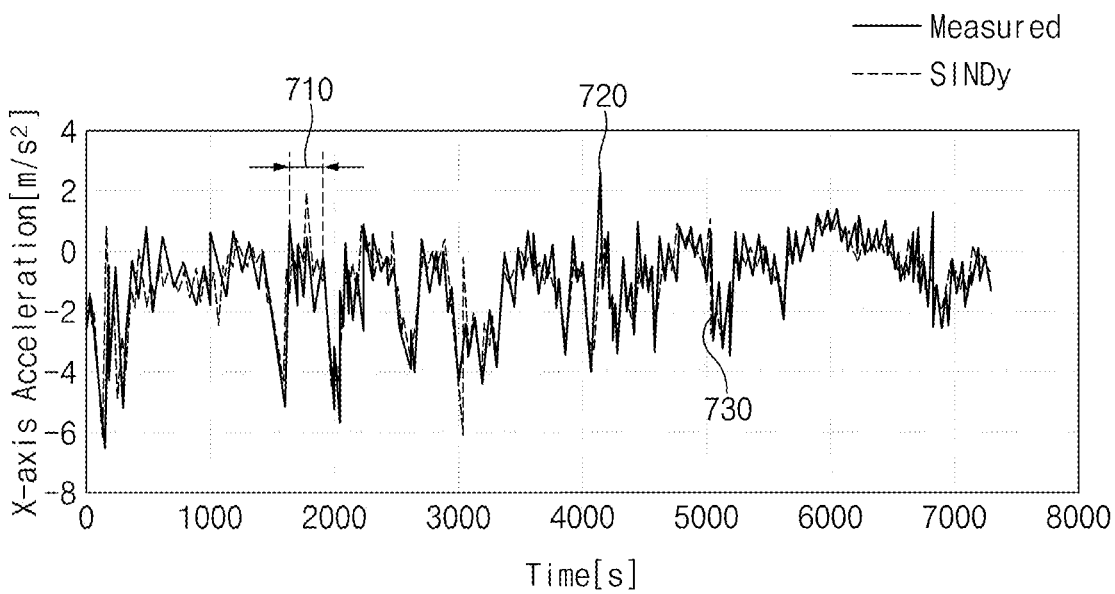
FIG. 7 is a graph illustrating performance of a first model generated using a dataset collected in a dynamic mode by the controller provided in the apparatus for estimating a motion of a vehicle occupant according to an embodiment of the present disclosure.

FIG. 7 is a graph illustrating performance of a first model generated using a dataset collected in a dynamic mode by the controller provided in the apparatus for estimating a motion of a vehicle occupant according to an embodiment of the present disclosure.

In FIG. 7, a horizontal axis represents a time, and a vertical axis represents an x-axis acceleration. Further, reference numeral "710" represents a steady state traveling section, reference numeral "720" represents an x-axis acceleration of the head of the occupant, which is actually measured, and reference numeral "730" represents an x-axis acceleration of the head of the occupant, which is estimated by the first model.

As illustrated in FIG. 7, it may be identified that the first model based on the dataset collected in the dynamic mode of the vehicle illustrates that oscillation can occur in the steady state traveling section.

Further, the controller 40 may determine the three-axis accelerations of the head of the occupant based on the first model when the longitudinal acceleration among the behavior data of the vehicle deviates from a first threshold range and may determine the three-axis accelerations of the head of the occupant based on the second model when the longitudinal acceleration "a" does not deviate from the first threshold range (e.g., $-2<a<2$) and does not deviate from a second threshold range (e.g., $-1<a<1$).

The controller 40 may finally determine the three-axis accelerations of the head of the occupant by multiplying the three-axis accelerations of the head of the occupant based on the first model and the three-axis accelerations of the head of the occupant based on the second model by a certain ratio when the longitudinal acceleration "a" does not deviate from the first threshold range (e.g., $-2<a<2$) and deviates from the second threshold range (e.g., $-1<a<1$). In this case, the controller 40 may apply an interpolation method. For example, when the three-axis acceleration of the head of the occupant based on the first model is 3 and the three-axis acceleration of the head of the occupant based on the second model is 2, 2.5 may be determined as the final three-axis acceleration of the head of the occupant.

Figure 8:
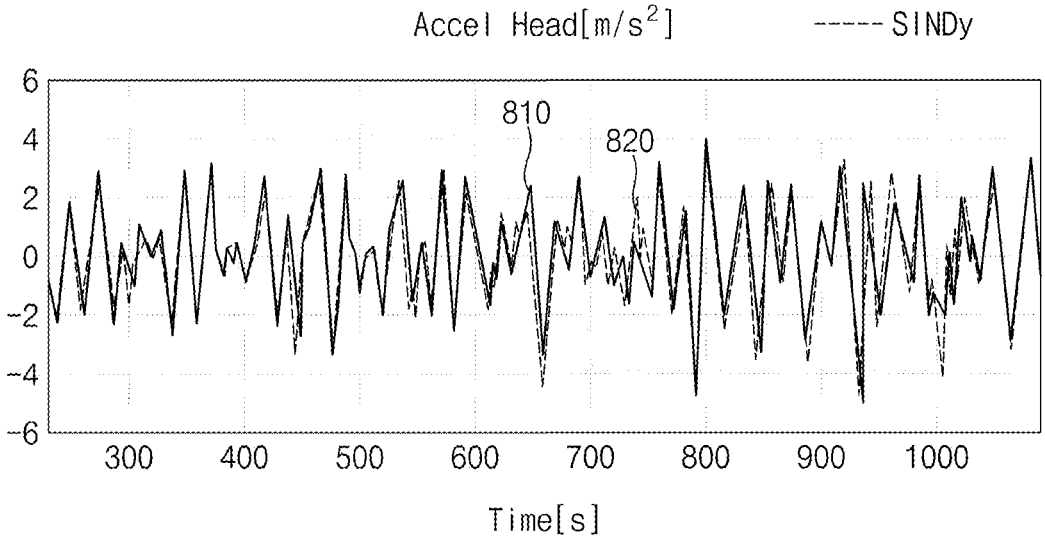
FIG. 8 is a diagram of performance analysis of the apparatus for estimating a motion of a vehicle occupant according to an embodiment of the present disclosure.

FIG. 8 is a graph of performance analysis of the apparatus for estimating a motion of a vehicle occupant according to an embodiment of the present disclosure.

In FIG. 8, a horizontal axis represents a time, and a vertical axis represents an acceleration of the head in the vertical direction (z axis). In addition, a solid line 810 represents an acceleration of the head in the vertical direction, which is actually measured, and a dotted line 820 represents an acceleration of the head in the vertical direction, which is estimated by the apparatus for estimating a motion of a vehicle occupant according to an embodiment of the present disclosure.

As illustrated in FIG. 8, the solid line 810 and the dotted line 820 are almost the same, and thus it may be identified that estimation performance of the apparatus for estimating a motion of a vehicle occupant according to an embodiment of the present disclosure is very excellent.

In addition, the controller 40 may directly predict the motion sickness of the occupant based on the three-axis accelerations of the head of the vehicle occupant. For example, it may be predicted that the occupant suffers from the motion sickness when at least one of a longitudinal acceleration, a transverse acceleration, and a vertical acceleration of the head of the vehicle occupant is greater than a threshold and the number of times the accelerations are greater than the threshold are greater than a preset time.

Figure 9:
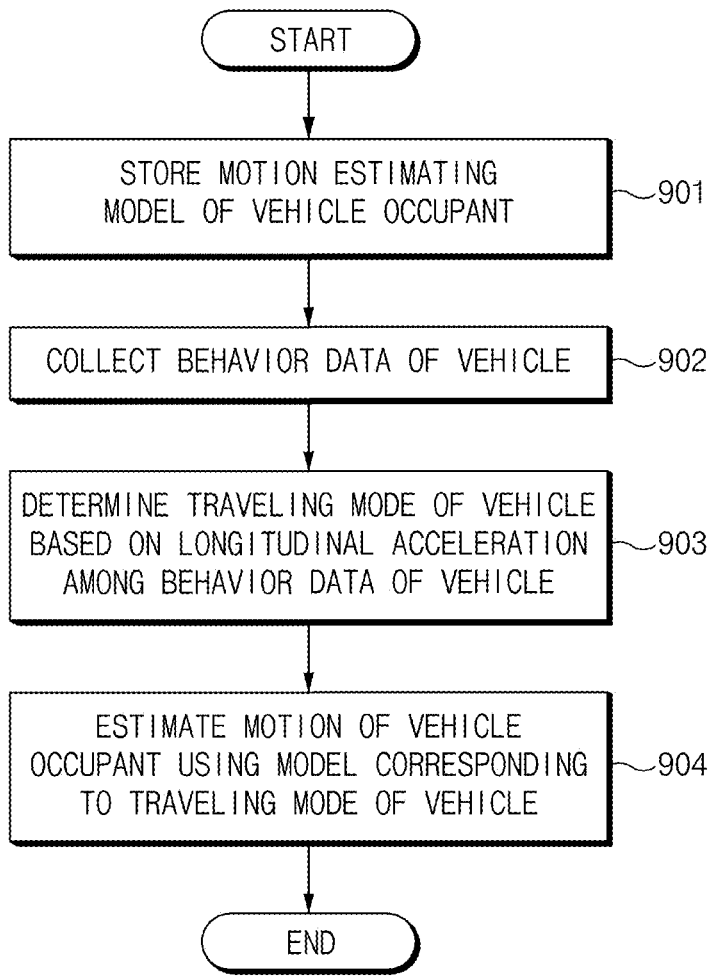
FIG. 9 is a flowchart illustrating a method of estimating a motion of a vehicle occupant according to an embodiment of the present disclosure.

FIG. 9 is a flowchart illustrating a method of estimating a motion of a vehicle occupant according to an embodiment of the present disclosure.

In operation 901, the storage device 10 can store a motion estimating model of the vehicle occupant.

In operation 902, the controller 40 can collect the behavior data of the vehicle through the vehicle network.

In operation 903, the controller 40 can determine the traveling mode of the vehicle based on the longitudinal acceleration among the behavior data of the vehicle.

In operation 904, the controller 40 can estimate the motion of the vehicle occupant using the model corresponding to the traveling mode of the vehicle.

Figure 10:
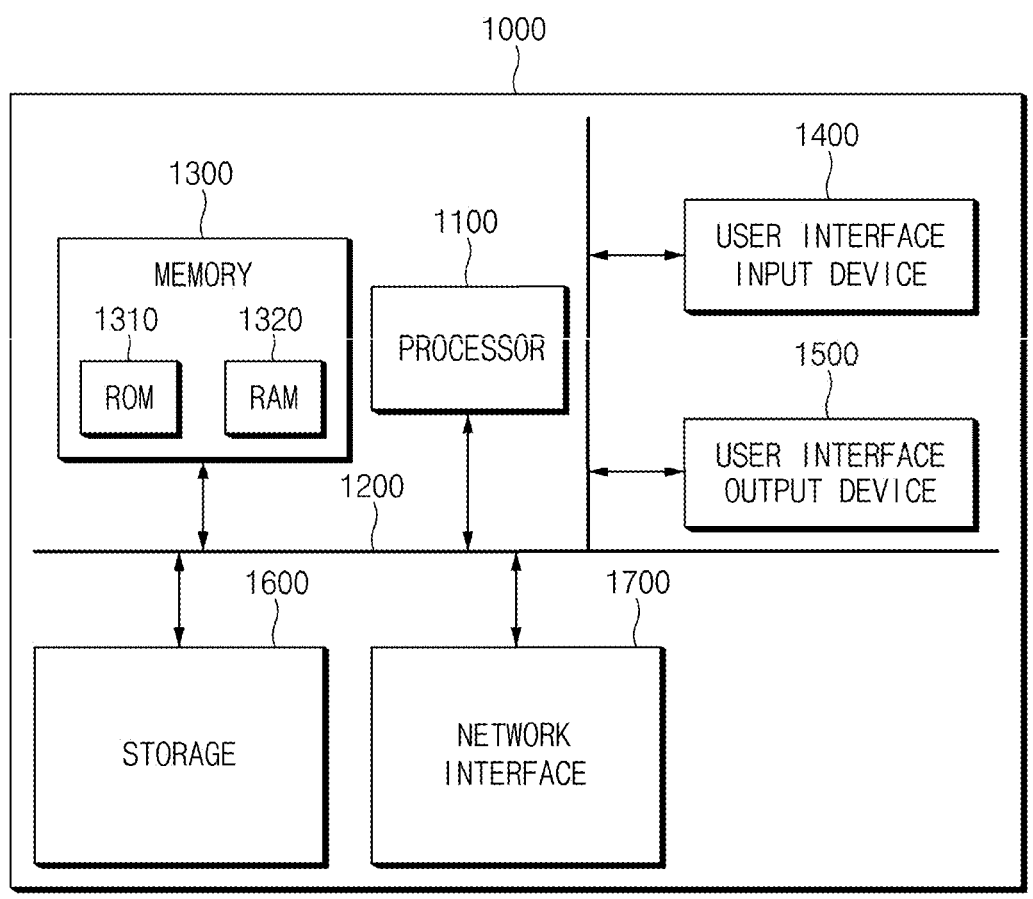
FIG. 10 is a block diagram illustrating a computing system for executing the method of estimating a motion of a vehicle occupant according to an embodiment of the present disclosure.

FIG. 10 is a block diagram illustrating a computing system for executing a method of estimating a motion of a vehicle occupant according to an embodiment of the present disclosure.

Referring to FIG. 10, the method of estimating a motion of a vehicle occupant according to an embodiment of the present disclosure may be also implemented through a computing system 1000. The computing system 1000 may include at least one processor 1100, a memory 1300, a user interface input device 1400, a user interface output device 1500, storage 1600, and a network interface 1700, which are connected through a system bus 1200, any combination of or all of which may be in plural or may include plural components thereof.

The processor 1100 may be a central processing unit (CPU) or a semiconductor device that processes commands stored in the memory 1300 and/or storage 1600. A storage medium can include the memory 1300 and the storage 1600, which may include various types of volatile or nonvolatile storage media. For example, the memory 1300 may include a read only memory (ROM) 1310 and a random access memory (RAM) 1320.

Thus, operations of a method or algorithm described in connection with some embodiments disclosed herein may be directly implemented in hardware, a software module, or a combination of the two components, which are executed by the processor 1100. The software module may reside in a storage medium (i.e., the memory 1300 and/or the storage 1600) such as a RAM, a flash memory, a ROM, an erasable programming ROM (EPROM), an electrically erasable and programmable ROM (EEPROM), a register, a hard disk, a removable disk, and a compact disk (CD)-ROM. An example storage medium may be coupled to the processor 1100, and the processor 1100 may read information from the storage medium and write information in the storage medium. In another manner, the storage medium may be integrated with the processor 1100. The processor 1100 and the storage medium may reside inside an application-specific integrated circuit (ASIC). The ASIC may reside inside a user terminal. In another manner, the processor 1100 and the storage medium may reside as an individual component inside the user terminal.

According to an embodiment of the present disclosure, behavior data of a vehicle can be collected, a traveling mode of the vehicle can be determined based on a longitudinal acceleration among the behavior data of the vehicle, a model corresponding to the traveling mode of the vehicle can be selected, a motion of the vehicle occupant can be estimated based on the model, and thus the motion of the vehicle occupant may be easily and accurately estimated.

The above description is merely illustrative of the technical spirit of the present disclosure, and those skilled in the art to which the present disclosure pertains may make various modifications and changes without departing from features of the present disclosure. Thus, the example embodiments disclosed in the present disclosure are not intended to limit the technology spirit of the present disclosure but are intended to describe the present disclosure, and the scope of the technical spirit of the present disclosure is not necessarily limited by these embodiments. The scope of protection of the present disclosure can be interpreted by the appended claims, and all technical spirits within the scope equivalent thereto can be interpreted as being included in the scope of the present disclosure.

What is claimed is:

1. An apparatus comprising:
   one or more processors; and
   a non-transitory storage medium storing a plurality of motion estimating models corresponding to different traveling modes and computer-readable instructions that, when executed by the one or more processors, enable the one or more processors to collect behavior data of a vehicle, determine a traveling mode of the vehicle based on a longitudinal acceleration among the behavior data of the vehicle, select a first motion estimating model corresponding to the traveling mode of the vehicle from among the plurality of motion estimating models, and estimate a motion of a vehicle occupant using the first motion estimating model corresponding to the traveling mode of the vehicle.

2. The apparatus of claim 1, wherein at least one of the plurality of motion estimating models estimates the motion of the vehicle occupant corresponding to the behavior data of the vehicle.

3. The apparatus of claim 1, wherein the plurality of motion estimating models include the first motion estimating model corresponding to a dynamic mode of the vehicle and a second motion estimating model corresponding to a steady state mode of the vehicle.

4. The apparatus of claim 3, wherein the instructions further enable the one or more processors to estimate an acceleration of a head of the vehicle occupant corresponding to the behavior data of the vehicle using the first motion estimating model, based on a determination that the longitudinal acceleration deviates from a first threshold range, and wherein the instructions further enable the one or more processors to estimate an acceleration of a head of the vehicle occupant corresponding to the behavior data of the vehicle using the second motion estimating model, based on a determination that the longitudinal acceleration is within the first threshold range and is within a second threshold range.

5. The apparatus of claim 4, wherein the instructions further enable the one or more processors to determine that the acceleration of the head of the vehicle occupant is a value between a first acceleration of the head of the vehicle occupant estimated using the first motion estimating model and a second acceleration of the head of the vehicle occupant estimated using the second motion estimating model, based on a determination that the longitudinal acceleration is within the first threshold range and deviates from the second threshold range.

6. The apparatus of claim 3, wherein the instructions further enable the one or more processors to collect, as the behavior data of the vehicle, one of or any combination of three-axis accelerations, three-axis speeds, a roll angle, a roll angle rate, a pitch angle, and a pitch angle rate.

7. The apparatus of claim 6, wherein the instructions further enable the one or more processors to remove noise from the behavior data of the vehicle.

8. The apparatus of claim 7, wherein the instructions further enable the one or more processors to normalize the behavior data of the vehicle from which the noise is removed.

9. The apparatus of claim 1, wherein the instructions further enable the one or more processors to predict motion sickness of the vehicle occupant based on the motion of the vehicle occupant.

10. A method comprising:
collecting behavior data of a vehicle;
determining a traveling mode of the vehicle based on a longitudinal acceleration among the behavior data of the vehicle;
selecting a first motion estimating model corresponding to the traveling mode of the vehicle from among a plurality of motion estimating models that each correspond to a different traveling mode; and
estimating a motion of a vehicle occupant using the first motion estimating model corresponding to the traveling mode of the vehicle.

11. The method of claim 10, wherein at least one of the plurality of motion estimating models estimates the motion of the vehicle occupant corresponding to the behavior data of the vehicle.

12. The method of claim 10, wherein the plurality of motion estimating models comprise the first motion estimating model corresponding to a dynamic mode of the vehicle, and a second motion estimating model corresponding to a steady state mode of the vehicle.

13. The method of claim 12, wherein the estimating of the motion of the vehicle occupant includes:
estimating an acceleration of a head of the vehicle occupant corresponding to the behavior data of the vehicle using the first motion estimating model, based on a determination that the longitudinal acceleration deviates from a first threshold range; and estimating an acceleration of the head of the vehicle occupant corresponding to the behavior data of the vehicle using the second motion estimating model, based on a determination that the longitudinal acceleration is within the first threshold range and is within a second threshold range.

14. The method of claim 13, wherein the estimating of the motion of the vehicle occupant further includes determining that the acceleration of the head of the vehicle occupant is a value between a first acceleration of the head of the vehicle occupant estimated using the first motion estimating model and a second acceleration of the head of the vehicle occupant estimated using the second motion estimating model, based on a determination that the longitudinal acceleration is within the first threshold range and deviates from the second threshold range.

15. The method of claim 12, wherein the collecting of the behavior data of the vehicle includes collecting as the behavior data of the vehicle one of or any combination of three-axis accelerations, three-axis speeds, a roll angle, a roll angle rate, a pitch angle, and a pitch angle rate.

16. The method of claim 15, wherein the collecting of the behavior data of the vehicle further includes removing noise from the behavior data of the vehicle.

17. The method of claim 16, wherein the collecting of the behavior data of the vehicle further includes normalizing the behavior data of the vehicle from which the noise is removed.

18. The method of claim 10, further comprising predicting motion sickness of the vehicle occupant based on the motion of the vehicle occupant.

19. The method of claim 10, wherein:
the collecting of the behavior data of the vehicle further includes collecting at least one of three-axis accelerations, three-axis speeds, a roll angle, a roll angle rate, a pitch angle, and a pitch angle rate of the vehicle; and
the method further comprises removing noise from the collected behavior data of the vehicle and normalizing the behavior data of the vehicle from which the noise is removed before determining the traveling mode of the vehicle.

20. A method comprising:
collecting behavior data of a vehicle, the behavior data including at least a longitudinal acceleration of the vehicle;
determining a traveling mode of the vehicle based on whether the longitudinal acceleration deviates from a first threshold range, wherein the traveling mode is determined to be a dynamic mode when the longitudinal acceleration deviates from the first threshold range and is determined to be a steady state mode when the longitudinal acceleration is within the first threshold range;
selecting a first motion estimating model corresponding to the determined traveling mode of the vehicle from among a plurality of motion estimating models, wherein the plurality of motion estimating models includes a first model corresponding to the dynamic mode and a second model corresponding to the steady state mode; and
estimating a motion of a head of a vehicle occupant using the selected first motion estimating model, wherein the estimating includes determining three-axis accelerations of the head of the vehicle occupant based on the behavior data of the vehicle.

* * * * *